United States Patent [19]

Shibaike et al.

[11] Patent Number: 4,648,000
[45] Date of Patent: Mar. 3, 1987

[54] TAPE CASSETTE

[75] Inventors: Narito Shibaike, Habikino; Satoshi Kikuya, Katano; Seiko Minamide, Nara, all of Japan

[73] Assignee: Matsushita Electric Industrial Co., Ltd., Osaka, Japan

[21] Appl. No.: 467,472

[22] Filed: Feb. 17, 1983

[30] Foreign Application Priority Data

Feb. 26, 1982 [JP] Japan .................. 57-28007[U]

[51] Int. Cl.$^4$ .................................. G11B 23/02
[52] U.S. Cl. .................................. 360/132; 242/199
[58] Field of Search ............. 360/132; 206/387; 242/194, 197–200

[56] References Cited

U.S. PATENT DOCUMENTS 3,669,384  6/1972  Hathaway ................ 242/194
4,341,365  7/1982  Oishi ...................... 242/199
4,420,128 12/1983  Okamara ................ 242/199
4,485,990 12/1984  Ogiro ..................... 242/199

Primary Examiner—A. J. Heinz
Attorney, Agent, or Firm—Spencer & Frank

[57] ABSTRACT

A tape cassette includes reel hubs rotatably received in the housing of the cassette, each reel hub being formed with a recess. The recess includes an opening at its lower end and reel pawls therein are adapted to engage with pawls of a reel drive on a reel base. The recess further includes a cylindrical-shaped portion disposed below the reel pawls and a conical-shaped portion disposed below the cylindrical-shaped portion, one of which portions is caused to engage with an engaging surface of the reel base of the reel drive on the reel base, thus enabling the centers of the reel hub and the reel base to correspond with each other.

1 Claim, 9 Drawing Figures

TAPE CASSETTE

BACKGROUND OF THE INVENTION

The present invention relates to a tape cassette which is to be loaded on a magnetic recording and reproducing apparatus.

With a magnetic recording and reproducing apparatus and the like using a tape cassette, it is indispensable to the operation of the apparatus to load reels received in the tape cassette on the reel bases of the apparatus. The magnetic recording and reproducing apparatus considerably depends on smoothness, easiness and preciseness of the loading and positioning of the tape cassette on the apparatus for its over-all performance and handiness. Accordingly, various expedients have been done in connection with the shape of reels in the tape cassette and shapes of reel bases in the apparatus. Arrangement of reels in a prior tape cassette and prior reel bases, on which the reels are loaded, will be described hereinbelow with reference to several accompanying drawings.

Referring first to FIG. 1, there is shown a tape cassette 4 which receives therein a pair of reels 11 (one of which is illustrated). Each reel 11 includes a reel hub 3 with a magnetic tape wound therearound, an upper flange 2 and a lower flange 3a integrally formed with the reel hub 3, these flanges 2 and 3a being adapted to limit widthwise movement of the magnetic tape 1. A projection 3d provided centrally at the top of the reel hub 3 is biased by one end of a reel spring 5 in the widthwise direction of the tape cassette 4, the other end of the spring being secured to the tape cassette 4.

The reel hub 3 is formed at its lower end with an open ended recess which in turn is provided at its inner periphery with a plurality of radially extending pawls 3b. The pawls are adapted to engage with pawl pieces 8a of a pawl 8 (see FIG. 2) which is rotatable integrally with a body of the magnetic recording and reproducing apparatus. An abutment 3c extending beyond the lower flange 3a is formed at the lower, thicknesswise end of the tape cassette 4 for abutting against the reel base 10 provided on the body of the apparatus. The abutment 3c has a smaller diameter than that of an opening 4a formed at a lower portion 4' of the tape cassette 4.

The construction of the reel base will be explained with reference to FIG. 2 which permits the tape cassette as constructed in the above manner to be loaded on the magnetic recording and reproducing apparatus and a magnetic tape to run for recording and reproduction. In the drawing, reference numeral 10 designates a reel base rotatably mounted on a reel shaft 6 which is secured to a base plate 12 of the apparatus. A washer 13 is axially interposed between the reel base 10 and the reel shaft 6 of the base plate 12. A top end 10a of the reel base 10 constitutes an abutment surface for abutting against the abutment 3c of the reel hub 3 and limits height and inclination of the reel 11 relative to the base plate 12. A central, hexagonal column 10b of the reel base 10 is adapted to slidably engage the pawl 8 having a plurality of pawl pieces 8a which are adapted to engage with the pawl 3b of the reel hub 3. The engagement between the column 10b and the pawl 8 is assisted by a pawl spring 9. The pawl 8 is biased upward by the pawl spring 9 to be vertically moveable along the outer peripheral surface of the column 10b, and is limited in its movement by engagement with the underside of a reel cap 7.

In FIG. 3, a tape cassette is shown as being loaded on the reel base as described above. The abutment 3c of the reel hub 3 abuts against the top end 10a of the reel base 10 and is assisted by the biasing force of the reel spring 5 toward the reel base 10 to limit the height of the reel 11. In this position, the outer periphery of the reel cap 7 engages with the inner ends of the pawls 3b of the reel hub 3 to center the reel 11. The pawls 3b of the reel hub 3 engage with the pawl pieces 8a of the pawl 8 to permit the toque of the reel base 10 to be transmitted to the reel 11. A driving idler (not shown) for the reel base abuts against the reel base 10, as desired, to rotate the same.

In FIG. 4, the tape cassette 4 is shown in the course of being loaded on the reel base 10 whereupon the path along which the tape cassette 4 is moved onto the reel base 10 is not parallel to the reel shaft 6, but is inclined thereto or describes an arc. As seen from the drawing, the inner diameter of the pawl 3b is uniform in the axial direction of the reel 11 and the inner ends of the pawls 3b are fitted on the outer periphery of the reel cap 7, so that the inner ends of the pawls 3b abut against the outer periphery of the reel cap 7 in inclined relationship therewith to wedge thereonto. The path along which the tape cassette 4 is being loaded on the reel base 10 is influenced by the path of a cassette holder (not shown) which receives the tape cassette 4 and moves toward the apparatus. In this regard, the cassette holder becomes complicated in construction in order to correctly control the path of movement of the tape cassette 4. In the loaded position, the inner ends of the pawls 3b extend parallel to the axis of the reel shaft 6, and so the reel cap 7 should be guided parallel to the inner ends of the pawls 3b during the loading operation of the reel 11 onto the reel base 10. Thus the center of the reel 11 of the tape cassette 4 must be precisely aligned relative to the reel shaft 6 and accuracy must be maintained in association with the position of the tape cassette 4 in the cassette holder and the loading path thereof. In view of the fact that the pawls 3b engage with the reel cap 7 even when the tape cassette 4 is moved onto the reel base 10 slantwise, there may be conceivably provided an allowance for movement of the reel 11 in the tape cassette 4 in the thicknesswise direction. If such alowance were adequately provided, the tape cassette would be complicated in construction in order to maintain the positional accuracy of the reel 11 in the tape cassette 4. Accordingly, it has been desired to provide a tape cassette which permits a reel therein to be smoothly loaded on a reel base and to be accurately positioned thereon irrespective of the position of the tape cassette at the start of a loading operation thereof.

SUMMARY OF THE INVENTION

It is an object of the invention to provide a tape cassette which receives therein reels adapted to be readily and smoothly loaded on reel bases of a magnetic recording and reproducing apparatus and to be accurately positioned thereon.

A tape cassette according to the present invention comprises at least one reel hub rotatably received in a housing and provided with a length of magnetic tape wound therearound, a plurality of reel drive engaging portions disposed in a recess formed in the reel hub and extending toward the center of the reel hub, and a reel engaging portion adapted to engage with a portion of a reel base to position the center of rotation of the reel, said reel engaging portion being disposed below the reel drive engaging portions in the axial direction of the reel and being partially conical-shaped at its surface downward in the axial direction of the reel, so that the loading and positioning of the reel on the reel base is readily, smoothly and accurately effected and the reel can be loaded on several types of reel bases, respectively.

DESCRIPTION OF THE PREFERRED EMBODIMENTS

FIGS. 5 to 9 shown how a tape cassette according to the present invention is constructed and how the tape cassette is loaded on a reel base.

Figure 1:
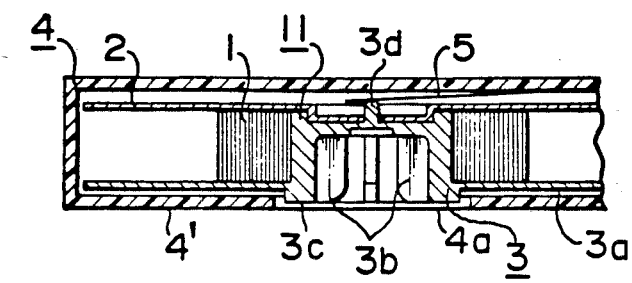
FIG. 1 is a cross-sectional view of essential parts of a prior art tape cassette.
Figure 2:
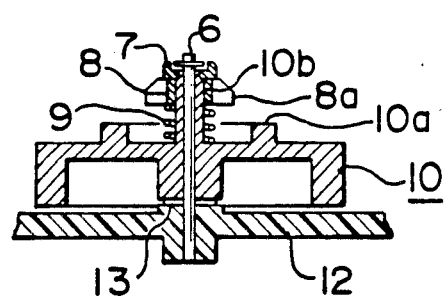
FIG. 2 is a fragmentary, sectional view of a reel base on which the prior art tape cassette is to be loaded.
Figure 3:
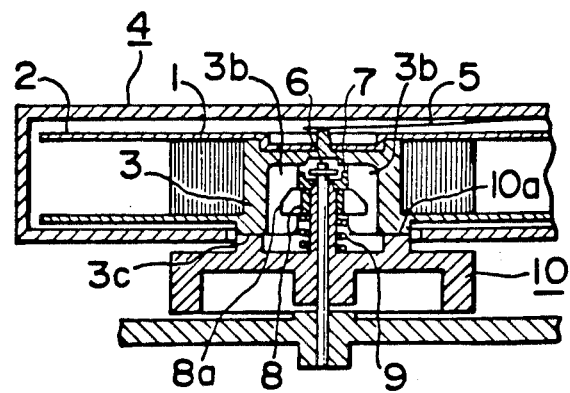
FIG. 3 is a fragmentary, sectional view of the prior art tape cassette as loaded on the reel base of FIG. 2.
Figure 4:
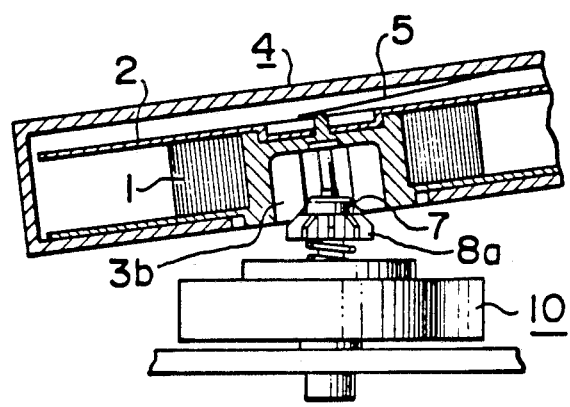
FIG. 4 is a fragmentary, sectional view of the prior art tape cassette in the course of being loaded on the reel base of FIG. 2.
Figure 5:
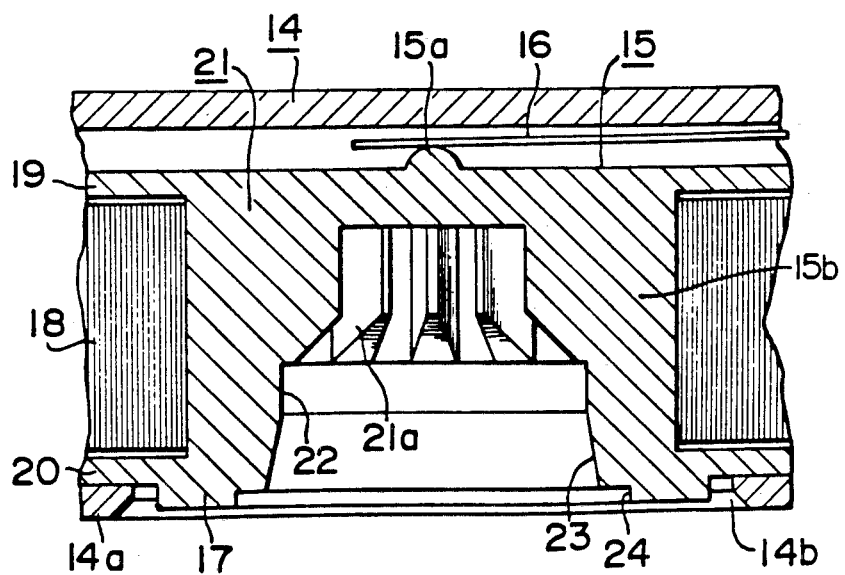
FIG. 5 is a fragmentary, sectional view of an essential part of a tape cassette according to the present invention.

Referring now to FIG. 5, there is shown a tape cassette according to the present invention in which a reel 15 is rotatably received in a housing 14 and includes a reel hub 15b provided centrally at its top with a pivot 15a. The pivot 15a is biased toward a lower portion 14a of the housing 14 by a spring 16, as in the prior art tape cassette.

The reel hub 15b is formed with a recess having an opening, around which an annular abutment 17 is formed. The diameter of the abutment 17 is somewhat smaller than that of an opening 14b formed at a lower portion 14a of the housing 14, and the abutment 17 is exposed to the outside, as shown in FIG. 5. A length of tape 18 is wound around the reel hub 15b, and upper and lower flanges 19 and 20, respectively, are formed on the reel 15 in the same manner as in the prior art tape cassette. Above the recess formed in the reel hub 15b are formed a plurality of reel pawls 21a which are adapted to engage with a plurality of radially extending pawls 31a (see FIG. 7) on a reel base to be described hereinafter.

Below the reel pawls 21a is formed a cylindrical-shaped engaging portion 22 which is adapted to engage with a mating, engaging portion 29 of the reel base (to be described hereinbelow) to center the reel 15. Below the engaging portion 22 is formed a conical-shaped engaging portion 23 which diverges downward. A relief 24 is provided at the opening of the recess in the reel 15. Provision is made for the relief 24 because surface precision of the associated engaging surfaces can be readily obtained by making the area of the surface of the abutment 17 small.

Figure 6:
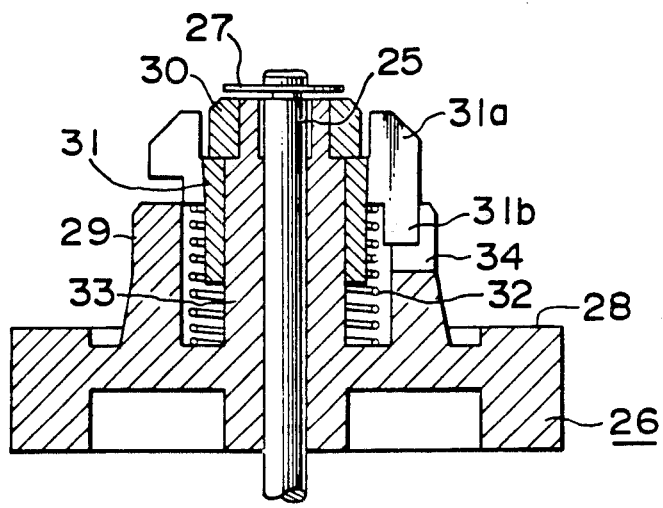
FIG. 6 is a fragmentary, sectional view of a reel base on which a tape cassette containing the part of FIG. 5 is to be loaded.

In FIG. 6 there is shown a reel base on which the tape cassette according to the present invention is loaded. A shaft 25 secured upright to a base plate (not shown) rotatably holds a body 26 of the reel base. Washer 27 is used for preventing disengagement of the body 26 from the shaft 25, and a detailed explanation of that arrangement is not required for present purposes. The reel base body 26 is formed with a support portion 28 for limiting the height of the reel 15 and with an engaging portion 29 in the form of a column, which engaging portion is adapted to fit in the engaging portion 22 of the reel 15 for centering thereof and is shaped at its lower portion like a frusto-cone. A stopper 30 is force-fitted on the top of the reel base body 26 to be integral therewith. A pawl member 31 having a plurality of radially extending pawls 31a is fitted on the central portion 33 of the reel base body 26 and is biased upward by a spring 32 to abut against the stopper 30. While the driving pawl member 31 is slidably movable along the outer periphery of the central portion 33 of the real base body 26, a lower portion 31b of one of the pawls 31a extends into a notch 34 formed in the reel base body 26 to cause co-rotation of the reel base body 26 and the driving pawl member 31 about the shaft 25.

Figure 7:
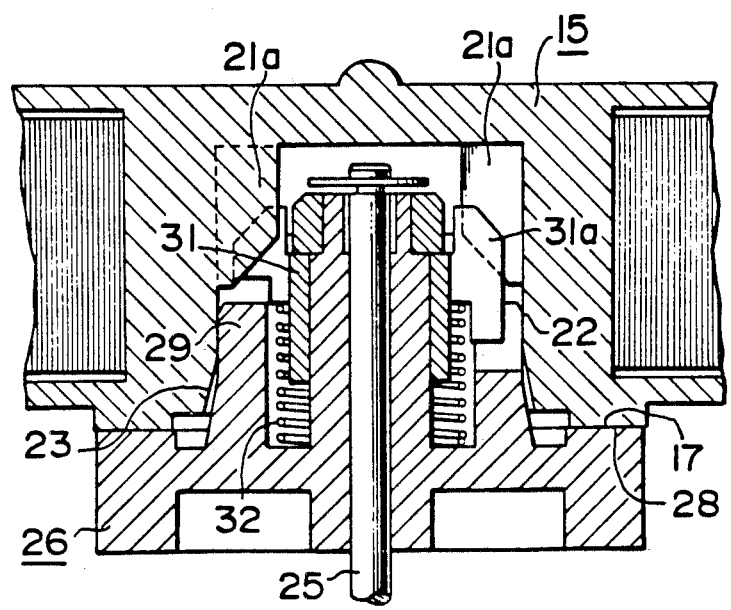
FIG. 7 is a fragmentary, sectional view of the tape cassette containing the part of FIG. 5 as loaded on the reel base of FIG. 6.

Referring to FIG. 7, a tape cassette according to the present invention is shown loaded on the reel base of FIG. 6. In FIG. 7, parts other than the reel 15 are omitted for clarity. When the tape cassette is loaded on the reel base, the abutment 17 of the reel 15 rests on the supporting portion 28 of the reel base body 26, so that the level of the reel 15 is fixed. Furthermore the cylindrical-shaped engaging portion 22 is fitted on the engaging portion 29 of the reel base body 26 to center the reel 15 relative to the axis of the reel base body 26 with the result that torque is transmitted from the reel base body 26 to the reel 15 by the engagement of the pawls 31a of the driving pawl member 31 with the reel pawls 21a. An idler (not shown) abuts against the reel base body 26, as desired, to impart torque thereto.

As shown in FIG. 7, the conical-shaped engaging portion 23 on the reel 15 presents a larger opening at the lower end of the reel 15 than at the engaging portion. When the engaging portion 29 of the reel base body 26 is caused to enter into the reel 15 (that is, the reel 15 is loaded on the reel base body), the above arrangement provides an adequate allowance for the loading operation, so that even if the path of movement of the reel 15 in the course of loading is somewhat offset relative to the shaft 25 or is arcuate or slantwise thereto, the loading of the tape cassette (not shown) on the reel has is smoothly effected. In case the reel pawls 21a engage with the pawls 31a of the driving pawl member 31, the loading is completed with the driving pawl member 31 depressed against the biasing force of the spring 32. Thereafter, upon the rotation of the reel base body 26, the biasing force of the spring 32 coupled with rotation of the driving pawl member 31 causes both pawls to slip relative to each other. When phases of both pawls are in register, driving pawl member 31 is moved up by the force of the spring 32 to provide proper engagement for rotation of the reel 15. As the engaging portion 22 is disposed deep in the recess of the reel 15, it is hard to undergo scratches due to contact with the respective part of the reel base body 26 or fingers in the course of loading, so that positional precision of the center of rotation upon engagement of the both pawls can be advantageously maintained.

Figure 8:
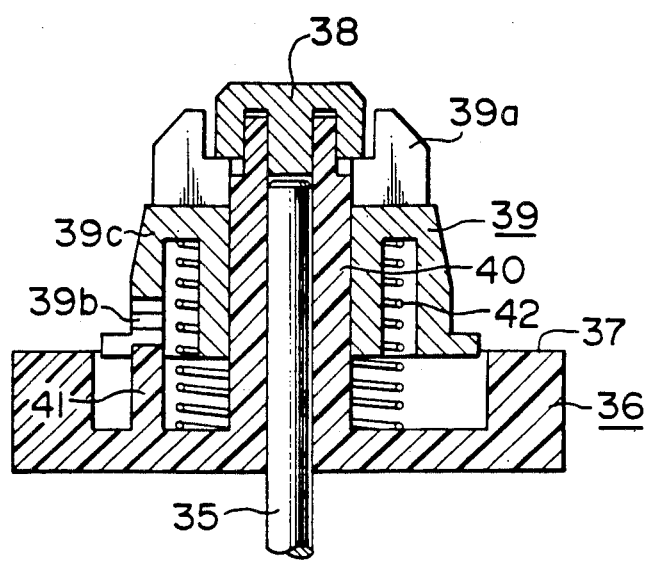
FIG. 8 is a sectional view of another type of a reel base on which a tape cassette containing the part of FIG. 5 is to be loaded.
Figure 9:
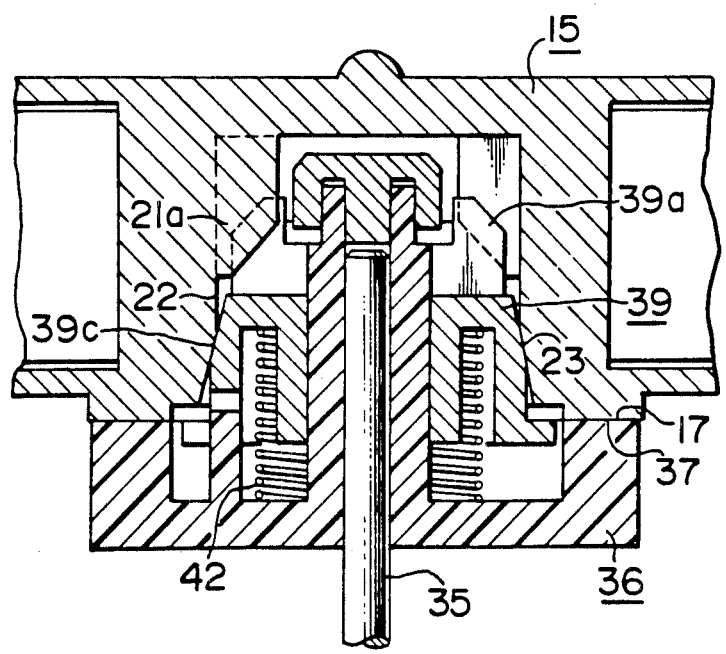
FIG. 9 is a fragmentary, sectional view of a tape cassette containing the part of FIG. 5 as loaded on the reel base of FIG. 8.

In FIGS. 8 and 9, there is shown the manner in which the tape cassette of the present invention according to FIG. 5 is loaded on a reel base of modified construction. FIG. 8 shows a reel base, of which a reel base body 36 is rotatably mounted on a shaft 35 secured upright to a base plate (not shown). Parts for limiting movement of the reel base body in the vertical direction are omitted in the drawings for simplicity. The reel base body 36 includes a supporting portion 37 adapted to abut against the abutment 17 of the reel 15 to thereby fix the level of the reel 15, and a central portion 40 with a stopper 38 force fitted thereon. A reel drive 39 includes a frusto-conical portion 39c vertically slidably mounted on the central portion 40 of the reel body 36 and a plurality of pawls 39a. A projection 41 formed on the reel base body 36 is adapted to enter into a notch 39b formed in the reel drive 39 so as to cause the reel base body 36 and the reel drive 39 to co-rotate about the shaft 35. The reel drive 39 is upwardly biased by a spring 42 toward the stopper 38.

In FIG. 9, the tape cassette according to FIG. 5 is shown loaded on the reel base of FIG. 8. In the drawing, only one reel 15 is shown, other parts of the tape cassette being omitted for clarity. When the tape cassette is loaded on the reel base, the abutment 17 of the reel 15 rests on the supporting portion 37 of the reel base body 36 to fix the level of the reel 15. The pawls 21a of the reel 15 engage with the pawls 39a of the reel drive 39 to transmit torque to the reel 15. The torque is imparted to the reel base body 36 by an idler (not shown) when it contacts with the base body, as desired. In this loaded position, the engaging portion 22 of the reel 15 is not in contact with any parts of the reel base body 36. As seen from FIG. 9, the reel drive 39 occupies a somewhat lower position relative to the reel base body 36 than in FIG. 8 such taht the frusto-conical portion 39c is fitted in the conical-shaped engaging portion 23. Thus the conical-shaped surfaces are of the same vertical angle in a manner to correctly center the reel about the shaft 35, thereby holding the reel drive 39 against the biasing force of the spring 42. In this regard, the leaf spring 16 for biasing the reel 15 downward has a larger spring constant than that of the spring 42. Owing to the provision of the relief 24 at the underside of the reel 15, the shape of the frusto-conical portion 39c of the reel drive 39 is not limited to the shape as shown in the drawings, but may be, for example, a frusto-cone of a larger height. The conical-shaped engaging portion 23 is disposed deeper in the recess of the reel 15 than the relief 24 and is thus hard to scratch, obviating the need for providing any relief on the reel base.

In the embodiment as shown of FIG. 8, the portion 39c to engaged by the engaging portion 23 of the reel 15 is conical-shaped, so that smooth loading can be attained even if the path of movement of the reel 15 toward the shaft 35 is not precise to some extent. If the reel pawls 21a interfere with the pawls 39a of the reel drive 39 in the course of loading, the reel drive 39 is moved downward against the force of the spring 42, and the torque of the reel base body 36 coupled with the biasing force of the spring 42 causes the reel pawls 21a to come in register with the pawls 39a of the reel drive 39, thus enabling normal rotation of the reel 15.

As described above, the tape cassette according to the present invention can be smoothly loaded on and correctly positioned on a reel base of a magnetic recording and reproducing apparatus even if the path of movement of the tape cassette toward the reel base during loading or the positional precision of the tape cassette with respect to the reel base is rough to some extent. In addition, the present tape cassette can be loaded on two types of reel bases, one of which is adapted to fit in the cylindrical-shaped engaging portion of the tape cassette to position the same in place, and the other of which is adapted to fit in the conical-shaped engaging portion of the reel of the tape cassette to position the same in place. Furthermore, according to the present invention, it is possible to simplify the construction of a cassette holder and the like, thereby reducing the weight and the manufacturing cost of a magnetic recording and reproducing apparatus.

The invention disclosed will have many modifications which will be apparent to those skilled in the art in view of the teachings of the specification. It is intended that all modifications which fall within the true spirit of this invention be included within the scope of the appended claims.

What is claimed is:

1. In a tape cassette including a housing and reels each rotatably disposed in the housing and having a hub formed with a recess, the recess having a lower end with an opening, each reel having a plurality of reel pawls extending radially inwardly toward the center of the recess and adapted to engage with a plurality of pawls of a reel drive mounted on a reel base, the reel base having an axis of rotation, the housing having openings each associated with a respective one of the recesses for receiving a reel base therethrough so that the pawls of the reel base engage with the reel pawls to cause the reel to co-rotatably engage with the reel base, the improvement wherein said recess comprises a cylindrical-shaped portion disposed below said reel pawls and a conical-shaped portion disposed below said cylindrical-shaped portion and diverging toward said opening of the recess, wherein one of the cylindrical-shaped portion and the conical-shaped portion cooperates with an engaging surface of the reel base or of the reel drive mounted on the reel base for centering the reel relative to the axis of rotation of the reel base, said conical-shaped portion serves to center the reel relative to, and axially position the same along the axis of rotation of the reel base when said conical-shaped portion engages with the engaging surface of the reel base or of the reel drive, and each said recess is provided at its opening with an annular recess having a larger diameter than the largest diameter of said conical-shaped portion.

* * * * *